(12) United States Patent
Appleby

(10) Patent No.: US 7,885,691 B2
(45) Date of Patent: Feb. 8, 2011

(54) APPARATUS FOR PROCESSING EVENT DATA

(75) Inventor: Richard M. Appleby, Warsash (GB)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 11/930,873

(22) Filed: Oct. 31, 2007

(65) Prior Publication Data

US 2008/0113690 A1     May 15, 2008

(30) Foreign Application Priority Data

Nov. 15, 2006    (GB)   ................................ 0622715.1

(51) Int. Cl.
*H04M 1/00* (2006.01)
(52) U.S. Cl. ................................ 455/569.2; 455/569.1
(58) Field of Classification Search ... 455/569.1–569.2, 455/423, 345; 340/901–905, 988–991, 425.5, 340/426.16, 426.25, 426.26, 438–445
See application file for complete search history.

(56) References Cited

U.S. PATENT DOCUMENTS

| 2003/0134660 A1 | 7/2003 | Himmel et al. |
| 2004/0063472 A1 | 4/2004 | Shimizu et al. |
| 2004/0236476 A1 * | 11/2004 | Chowdhary ..................... 701/1 |
| 2004/0246607 A1 | 12/2004 | Watson et al. |
| 2007/0027593 A1 * | 2/2007 | Shah et al. ..................... 701/30 |
| 2007/0225882 A1 * | 9/2007 | Yamaguchi et al. ........... 701/36 |
| 2008/0122602 A1 * | 5/2008 | Westley et al. .............. 340/438 |

FOREIGN PATENT DOCUMENTS

| FR | 2847409 A1 | 5/2004 |
| WO | 03030567 A1 | 4/2003 |
| WO | 03070093 A1 | 8/2003 |
| WO | WO 03/070093 A1 | 8/2003 |

OTHER PUBLICATIONS

PCT, "Notification of Transmittal of the International Search Report and the Written Opinion of the International Searching Authority, or the Declaration", International Application No. PCT/EP2007/060332.

* cited by examiner

*Primary Examiner*—Kamran Afshar
(74) *Attorney, Agent, or Firm*—Andrea Bauer Hoffman Warnick LLC (57) ABSTRACT

An apparatus for processing event data for use with a communications system comprising a wireless device operable for use in a vehicle. The apparatus in accordance with an embodiment includes: a receiver for receiving event data associated with the vehicle; a logic analyzer, responsive to receipt of the event data, for determining a score value associated with the event data; and a system, responsive to determining the score value, for identifying an action for execution.

23 Claims, 6 Drawing Sheets

Score Logic

SCORE = 0

(a) IF rain < 6 THEN SCORE +=3
(b) IF rain > 6 THEN SCORE +=8

(c) IF speed = > 20 AND speed < 40 THEN SCORE +=5
(d) IF speed = > 40 AND speed < 60 THEN SCORE +=7
(e) IF speed = > 60 THEN SCORE +=10

APPARATUS FOR PROCESSING EVENT DATA

FIELD OF THE INVENTION

The present invention relates to an apparatus for processing event data and more particularly, to an apparatus for processing event data associated with a vehicle.

BACKGROUND OF THE INVENTION

Use of a wireless device (e.g., a mobile telephone) while driving can be dangerous, as it can be difficult for a user to focus their attention on one task (e.g., controlling the car) when conducting a parallel task (e.g., maintaining a telephone conversation). Thus, as a telephone conversation becomes a high focus task, the task of driving the car becomes a less high focus task.

Best practice (and in some countries, legal requirement) dictates that mobile telephones should not be used while driving. Some countries allow for a mobile telephone to be used with a hands-free device such that a user need not physically handle the mobile telephone to interact with the mobile telephone. However, even the use of a hands-free device can result in the user becoming distracted from driving.

W03/070093, entitled "System and Method for Monitoring & Managing Driver Attention Load" discloses a system and method for monitoring the physiological behavior of a driver that includes measuring a physiological variable of a driver, assessing a driver's behavioral parameter on the basis of at least the measured physiological variable, and informing the driver of the assessed driver's behavioral parameter.

Although the prior art solution provides feedback to a driver, there is a need for a finer-grained system.

SUMMARY OF THE INVENTION

According to a first aspect, there is provided an apparatus for processing event data for use with a communications system comprising a wireless device operable for use in a vehicle, the apparatus comprising: a receiver for receiving event data associated with the vehicle; a logic analyzer, responsive to receipt of the event data, for determining a score value associated with the event data; and a system, responsive to determining the score value, for identifying an action for execution.

The event data can be associated with a plurality of events (e.g., a rain event and a speed event), and can be stored in a storage device by the receiver.

In an embodiment, the logic analyzer is operable to use the event data and score logic in order to determine the score value. For example, the logic analyzer is operable to use the event data to evaluate at least one statement associated with the score logic in order to determine the score value. The apparatus comprises means for generating the score value in accordance with statistical data associated with at least one of: a user of a vehicle and a vehicle.

In an embodiment, the logic analyzer is operable to use the event data and weight logic in order to determine the score value. The weight logic comprises a weight associated with a plurality of events.

The logic analyzer is operable to invoke an executor for executing the identified action. More preferably, the wireless device is a mobile telephone and the executor is operable to send a command to at least one of: the mobile telephone and a hands free device associated with the mobile telephone in order to execute the identified action. Still further, the apparatus further comprises means for invoking the logic analyzer in response to at least one of: generation of further event data; and change associated with the event data and expiration of a time period.

According to a second aspect, there is provided a method for processing event data for use with a communications system comprising a wireless device operable for use in a vehicle, the method comprising: receiving event data associated with the vehicle; determining, in response to receipt of the event data, a score value associated with the event data; and identifying, in response to determining the score value, an action for execution.

According to a third aspect, there is provided a computer program comprising program code means adapted to perform the above method when the program is run on a computer.

BRIEF DESCRIPTION OF THE DRAWINGS

The present invention will now be described, by way of example only, with reference to embodiments thereof, as illustrated in the following drawings.

DETAILED DESCRIPTION OF THE INVENTION

Figure 1:
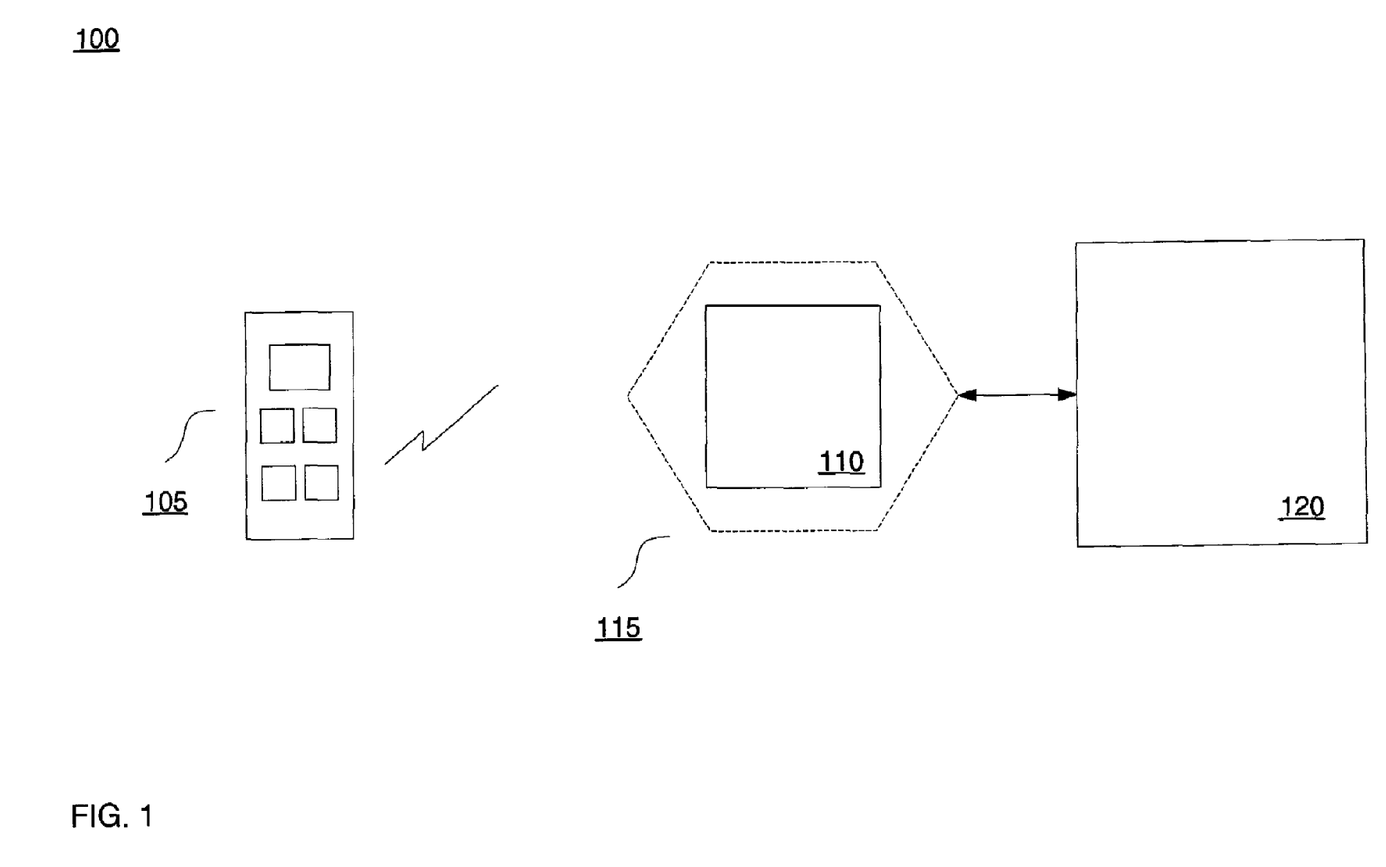
FIG. 1 depicts a block diagram illustrating a wireless communication system of the prior art.

FIG. 1 depicts a block diagram illustrating a wireless communication system (100) as is known in the art. In the description herein the communication system comprises a Global System for Mobile Communications system (GSM).

The wireless communication system (100) comprises a wireless device (105), e.g., a mobile telephone; a pager; a personal digital assistant (PDA), a two-way radio, etc. A wireless communication network is organized into one or more cells (115) and each cell comprises a base station (110). The base station (110) controls the radio link with the mobile telephone (105). The mobile telephone (105) communicates with a transmitter and receiver located in each cell (115).

Each base station is associated with a mobile switching center (MSC) (120). The MSC (120) performs switching actions to control calls to and from other systems.

Figure 2:
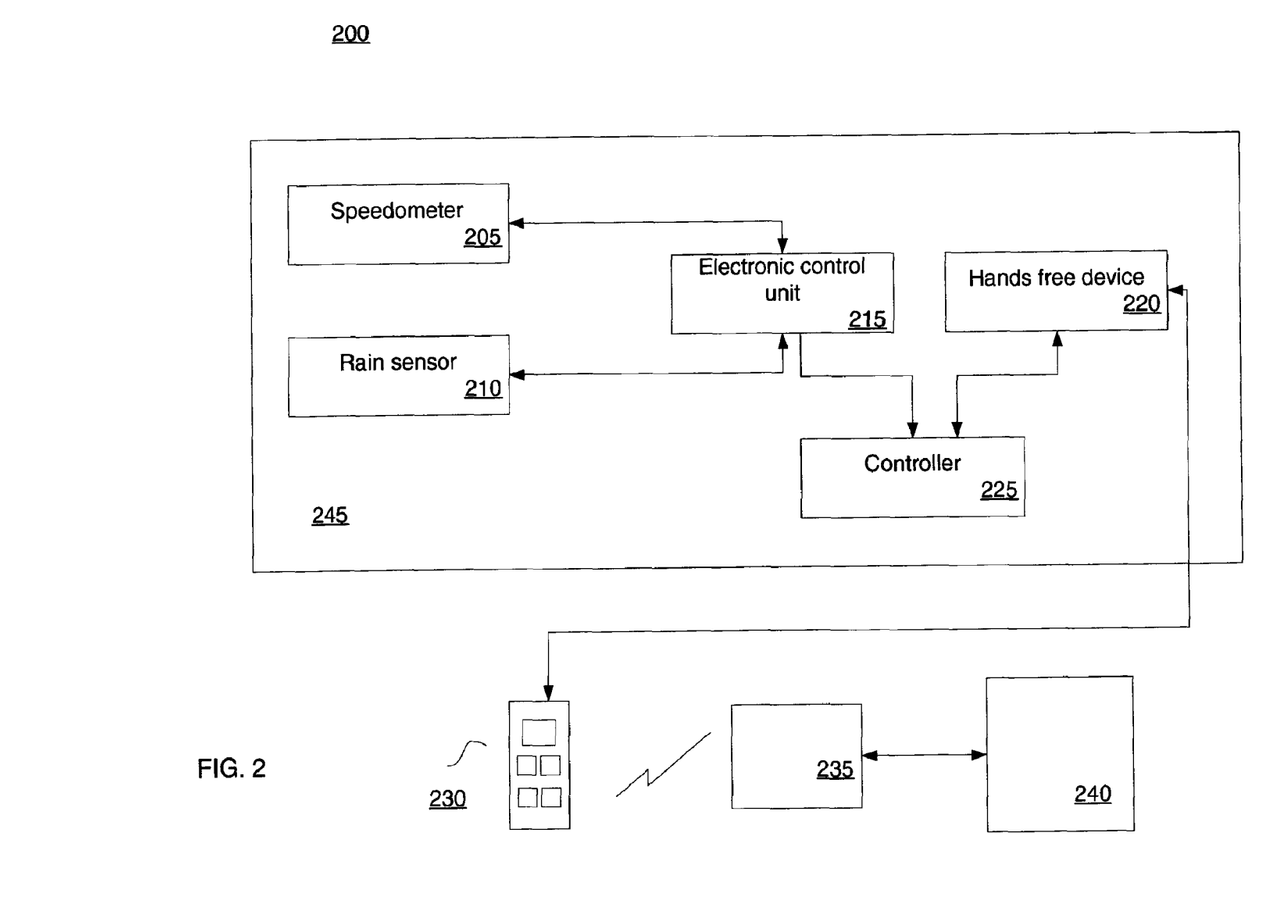
FIG. 2 is a block diagram depicting a system in accordance with an embodiment, wherein the system comprises a wireless communication system, such as that depicted in FIG. 1.

FIG. 2 is a block diagram depicting a system (200) in accordance with an embodiment of the present invention. The system (200) comprises a wireless communication system having a mobile phone (230), a base station (235), and an MSC (240).

The system (200) also comprises a vehicle (245) (e.g., a car, an airplane, etc.) having an electronic control unit (ECU) (215) for controlling and monitoring components of the vehicle (245). The ECU (215) is operable to communicate with a plurality of sensors (e.g., a speedometer (205), a rain sensor (210), etc.) in order to control components of the vehicle (245). For example, the rain sensor (210) is used to control automatic windscreen wipers. Although an ECU is described herein, it should be understood that any number of components associated with sensor communication can be used.

Each of the plurality of sensors (205, 210) is operable to detect an event. Events are indicative of driving conditions associated with the vehicle (245). Each of the plurality of sensors (205, 210) is also operable to communicate data associated with an event to the (ECU) (215).

It should be understood that the sensors (205, 210) described herein are exemplary and a number of other sensors associated with the vehicle (245) can be used (e.g., an ambient light sensor, a temperature sensor, etc.). Alternatively, sensors for sensing events associated with the user can be used in addition to, or in replacement of, the sensors associated with the vehicle (245). A hands-free device (220) is operable to interact with the mobile telephone (230), such that the mobile telephone (230) can be used in a hands-free manner. Typically, a hands-free device (220) provides an interface to associate speakers, a microphone, an aerial, a display, etc., with a mobile telephone (230) so that it can be more easily and safely used while a user is operating the vehicle (245). These connections can either be wired (e.g., to associate an aerial) or wireless (e.g., to associate speakers and a microphone) in nature.

The vehicle (245) also comprises a controller (225) in accordance with an embodiment. It should be understood that the controller (225) can reside on any component of the system (e.g., on the (ECU) (215); on the mobile telephone (230), etc). Further, it should be understood that the controller (225) can reside on any number of components of the system.

Figure 3:
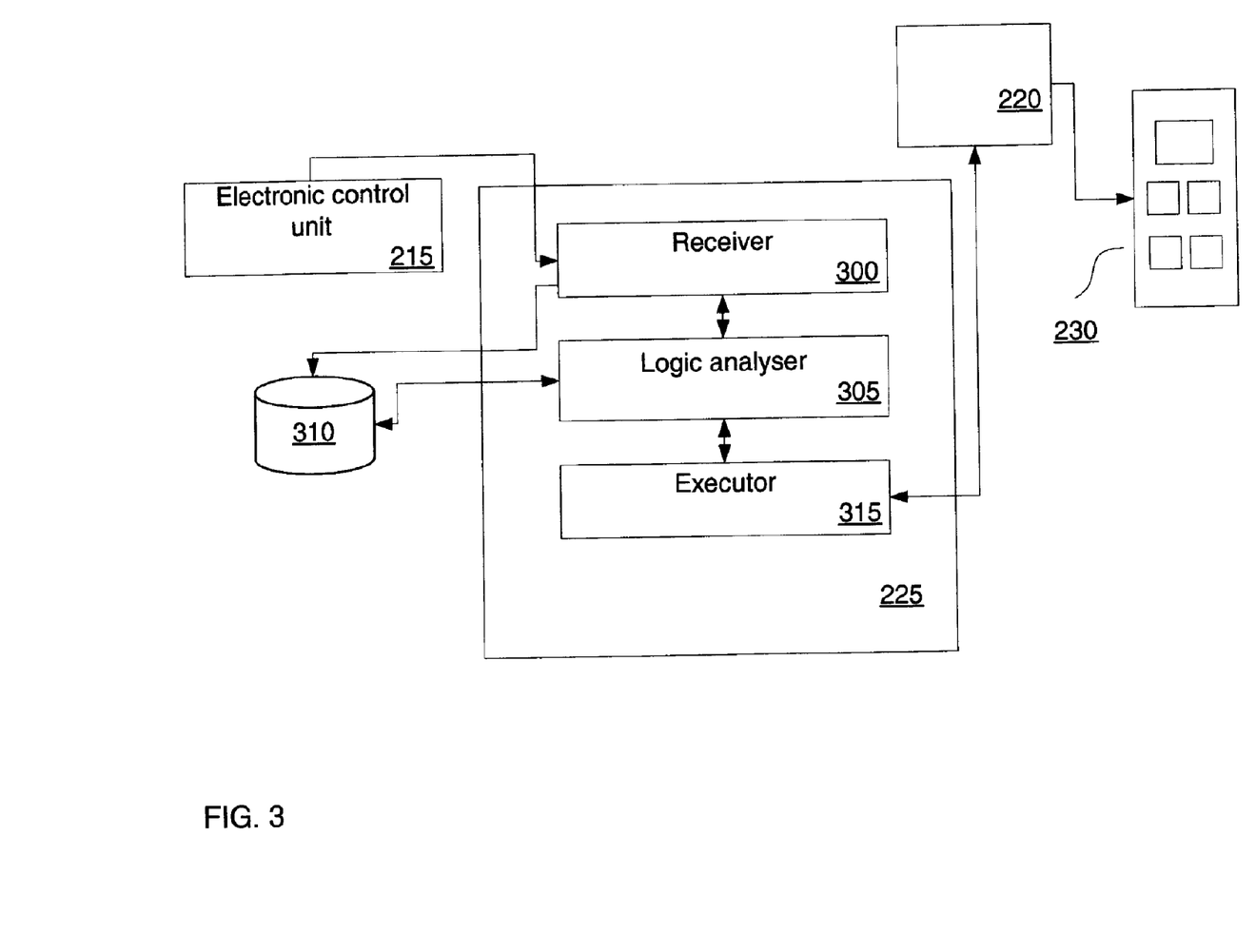
FIG. 3 is a block diagram of a controller in accordance with an embodiment.

As shown in more detail in FIG. 3, the controller (225) comprises a receiver (300) operable to communicate with the (ECU) (215) in order to obtain event data from the (ECU) (215) and store the event data in a storage device (310).

The controller (225) also comprises a logic analyzer (305), operable to communicate with the receiver (300). The logic analyzer (305) is operable to score event data using score logic (e.g., stored in the storage device (310)). The logic analyzer (305) is also operable to perform analysis as described later with reference to FIG. 6.

The controller (225) also comprises an executor (315), operable to communicate with the logic analyzer (305). The executor (315) is operable to execute an action.

An example of the embodiment will now be described with reference to FIGS. 2 to 6.

In the example, a user is controlling the vehicle (245). The user receives a call at their mobile telephone (230). The call is processed by the hands-free device (220).

Figure 4:
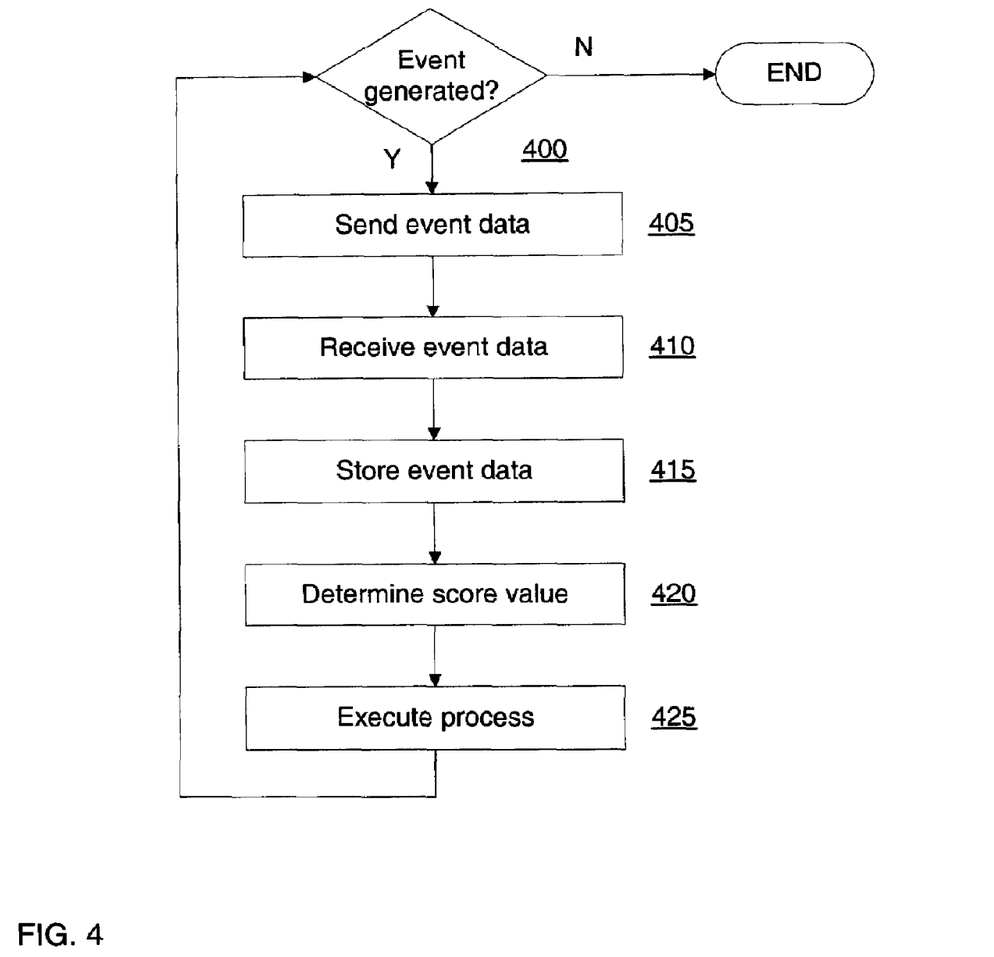
FIG. 4 is a flow chart showing the operational steps involved in a process according to an embodiment.

With reference to FIG. 4, a determination (400) is made by a sensor as to whether an event has been detected. If an event has not been detected, the process ends.

In the example, the speedometer (205) detects a speed event, wherein the speed event is associated with speed of the vehicle (245). In the example described herein, a speed event has an associated number of values between 0 and 100 (e.g., in miles per hour (mph) or kilometers per hour (kph)). In the example, the speed event has an associated value of 45.

In the example, the rain sensor (210) detects a rain event, wherein the rain event is associated with an amount of rain, and has an associated number of values between 0 (indicating no rain) and 10 (indicating very heavy rain). In the example, the rain event has an associated value of 6.

For each detected event, event data is passed to the ECU (215). Alternatively, the ECU (215) monitors sensors in order to obtain event data. It should be understood that event data can be passed to the ECU (215) (or obtained by the ECU (215)) in response to an event value meeting a pre-configurable threshold. The event data comprises a pre-configurable event identifier and event value (e.g., wherein for the rain event, the event identifier is "rain" and the event value is "6").

It should be understood that the ECU (215) can use the event data in a typical way in order to control a component of the vehicle (245) (e.g., automatic windscreen wipers).

According to an embodiment, the ECU (215) transmits (405) the received event data to the receiver (300). Alternatively, the receiver (300) obtains the event data from the ECU (215) and stores the event data in the storage device (310).

In the example, the event data is associated with the speed event and the rain event and comprises: event identifier="speed", event value="45"; event identifier="rain", event value="6". The receiver (300) receives (step 410) the event data and stores (step 415) the event data in the storage device (310). The receiver (300) also invokes the logic analyzer (305).

The logic analyzer (305) determines (420) a score value associated with event data by accessing score logic and the event data.

Figure 5:
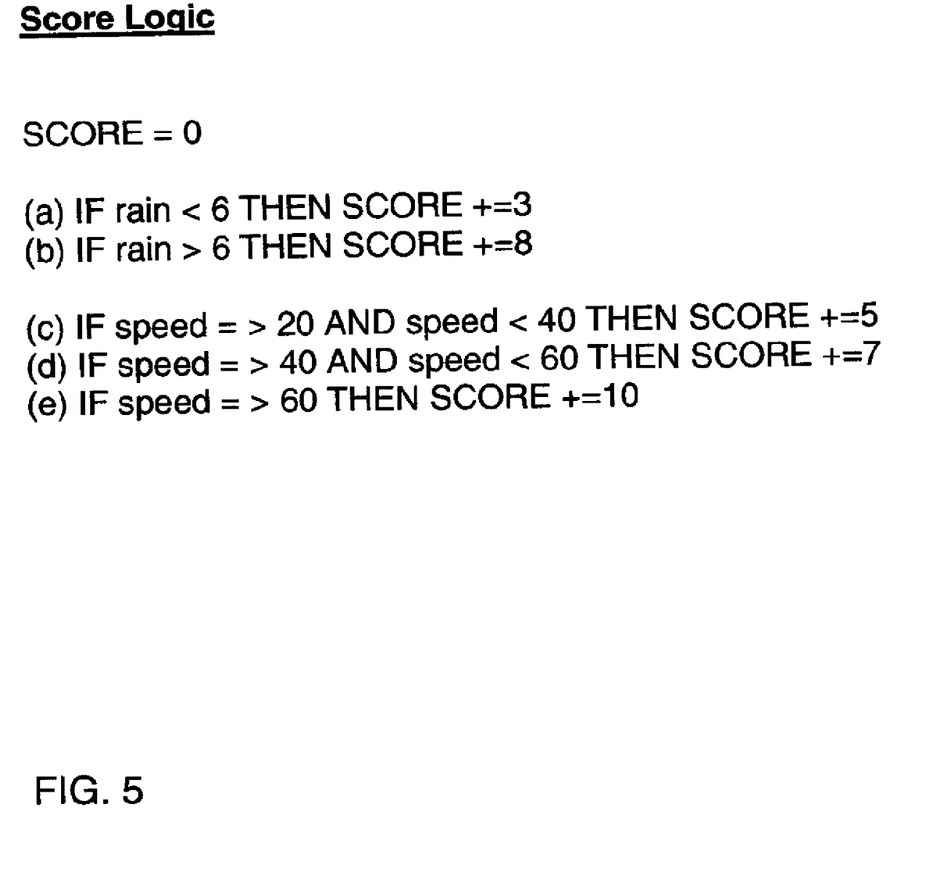
FIG. 5 is a representation of score logic according to an embodiment.

An example of the score logic is shown in FIG. 5. The score logic comprises a variable (i.e., "SCORE") with a value of "0". The score logic also comprises a plurality of statements (referenced by "a" to "e"). Each statement has an associated format of "IF (event identifier)=(event value) THEN SCORE=(score value)". The execution of a statement can alter the value of the variable "SCORE".

In a first example, a score value is configurable by a user, an administrator, etc. In a second example, a score value is generated in response to analysis of historical statistics associated with a user's experience of interacting with a wireless device whilst driving a vehicle. For example, (i) the historical statistics can be pre-generated in accordance with analysis of multiple users or (ii) the historical statistics can be generated in accordance with analysis of a particular user (or sub-set of users), a particular vehicle (245) (or sub-set of vehicles), etc. Advantageously, using the method identified by (i) can result in a more accurate score value (e.g., as multiple users, multiple vehicles can be analyzed).

The score logic analysis in the example described herein will now be described. The variable "SCORE" has an initial value of "0".

The logic analyzer (315) processes the statements sequentially by evaluating each statement using the stored event data. If the statement evaluates as true, the value of the variable "SCORE" is altered according to the statement. With reference to FIG. 5, in each statement, the value of the variable "SCORE" is incremented (as defined by the operator "+=") by an amount that is defined by a score value following the "+=" operator.

In response to evaluating statement "a" using event identifier "rain" and associated event value "6", the logic analyzer (305) determines that the statement evaluates as false. Thus, the value of the variable "SCORE" is not altered (i.e., the value remains as "0").

In response to evaluating statement "b" using event identifier "rain" and the event value "6", the logic analyzer (305) determines that the statement evaluates as true. The logic analyzer (305) alters the value of the variable "SCORE" (i.e., the value is incremented by "8").

In response to evaluating statement "c" using event identifier "speed" and associated event value "45", the logic analyzer (305) determines that the statement evaluates as false. Thus, the value of the variable "SCORE" is not altered (i.e., the value remains as "8").

In response to evaluating statement "d" using event identifier "speed" and associated event value "45", the logic analyzer (305) determines that the statement evaluates as true. The logic analyzer (305) alters the value of the variable "SCORE" (i.e., the value is incremented by "7", giving a value of "15").

In response to evaluating statement "e" using event identifier "speed" and associated event value "45", the logic analyzer (305) determines that the statement evaluates as false. Thus, the value of the variable "SCORE" is not altered (i.e., the value remains as "15").

Figure 6:
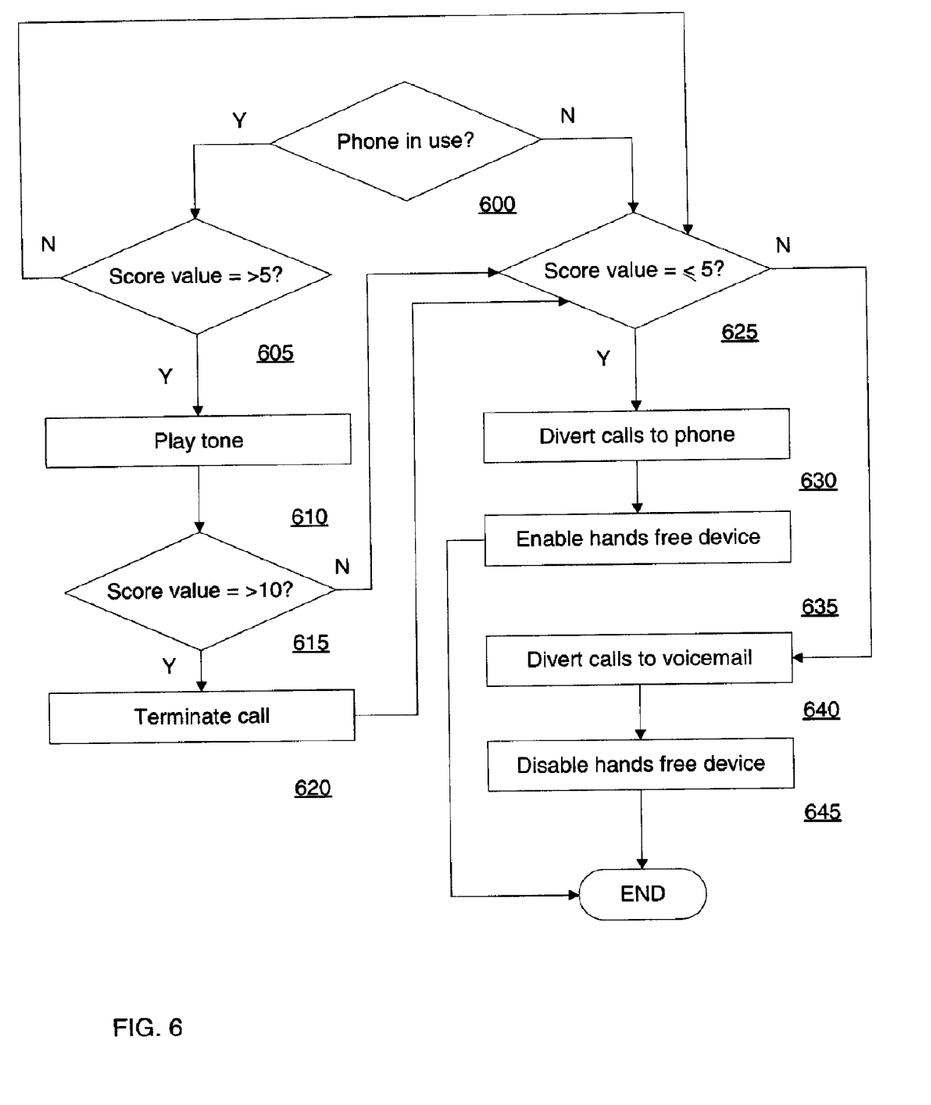
FIG. 6 is a flow chart showing the operational steps involved in a process according to an embodiment.

In response to determining (step 420) a score (i.e., "15"), a process depicted in FIG. 6 is executed (425), wherein the logic analyzer (305) performs analysis and wherein the executor (315) executes one or more actions.

At 600, the logic analyzer (305) determines whether the mobile telephone (230) is in use. For example, the logic analyzer (305) sends a query command to the hands-free device (220) in order to determine whether the mobile telephone (230) is in use. If the logic analyzer (305) determines that the mobile telephone (230) is not in use, the logic analyzer (305) executes 625 as will be described below.

In the example described herein, the logic analyzer (305) determines that the mobile telephone (230) is in use. The logic analyzer (305) then determines (605) whether the score value is more than "5".

If the logic analyzer (305) determines that the score value is not more than "5", the logic analyzer (305) executes 625 as will be described below.

In the example described herein, the logic analyzer (305) determines that the score value (i.e., 15) is more than "5" and in response, the logic analyzer (305) invokes the executor (315). In response to the invocation, the executor (315) executes (610) a first action. The first action is associated with playing an audio tone. For example, the executor (315) sends a command to the hands-free device (220) which causes the hands-free device (220) to output an audio signal using speakers accessible by the hands-free device (220).

For example, in a scenario wherein a user is controlling the vehicle (245), a call is in progress and event values detected indicate driving conditions that may require an increased level of focus from the user in order to control the vehicle (245), the audio signal serves as a warning notification to the user.

In response to execution of the first action, the logic analyzer (305) determines (615) whether the score value is more than "10". If the logic analyzer (305) determines that the score value is not more than "10", the logic analyzer (305) executes 625 as will be described below.

In the example described herein, the logic analyzer (305) determines that the score value (i.e., 15) is more than "10" and in response, the logic analyzer (305) invokes the executor (315). In response to the invocation, the executor (315) executes (620) a second action. The second action is associated with terminating the call in progress. For example, the executor (315) sends a command to the hands-free device (220) which causes the hands-free device (220) to cause the mobile telephone (230) to terminate the call.

For example, in a scenario wherein a user is controlling the vehicle (245), a call is in progress and event values detected indicate driving conditions that may require an increased level of focus from the user in order to control the vehicle (245), by terminating the call in progress, the user is able to provide the increased level of focus.

The logic analyzer (305) determines in 625 whether the score value is less than or equal to "5". If the logic analyzer (305) determines that the score value is less than or equal to "5", the logic analyzer (305) invokes the executor (315).

The executor (315) executes (630) a third action. The third action is associated with diverting further inbound calls to the mobile telephone (230), where they can be received by the user. For example, the executor (315) sends a command to the hands-free device (220) which passes the command to the mobile telephone (230). The mobile telephone (230) passes the command to the network infrastructure. In response to receiving the command, the network infrastructure routes any further calls to the mobile telephone (230).

The executor (315) also executes (635) a fourth action. The fourth action is associated with enabling the hands-free device (220), such that the user can make outbound calls. For example, the executor (315) sends a command to the hands-free device (220) which causes enablement of the hands-free device (220).

For example, in a scenario wherein a user is controlling the vehicle (245) (whether or not the mobile telephone is in use (600)) and wherein event values detected indicate driving conditions that may not require an increased level of focus from the user in order to control the vehicle (245), the result of the third and fourth actions is that the user is able to receive inbound calls and make outbound calls.

In response to the fourth action being executed, the process completes.

In the example described herein, the logic analyzer (305) determines that the score value (i.e., 15) is not less than or equal to "5" and in response, the logic analyzer (305) invokes the executor (315).

The executor (315) executes (640) a fifth action. The fifth action is associated with diverting further inbound calls to a voicemail service associated with the mobile telephone (230). For example, the executor (315) sends a command to the hands-free device (220) which passes the command to the mobile telephone (230). The mobile telephone (230) passes the command to the network infrastructure. In response to receiving the command, the network infrastructure routes any further calls to a voicemail service associated with the mobile telephone (230).

The executor (315) also executes (645) a sixth action. The sixth action is associated with disabling the hands-free device (220), such that the user cannot make outbound calls. For example, the executor (315) sends a command to the hands-free device (220) which causes disabling of the hands-free device (220).

For example, in a scenario wherein a user is controlling the vehicle (245) (whether or not the mobile telephone is in use (600)) and wherein event values detected indicate driving conditions that may require an increased level of focus from the user in order to control the vehicle (245), the result of the fifth and sixth actions is that the user is prevented from receiving inbound calls and making outbound calls.

In response to the sixth action being executed, the process completes.

With reference to FIG. 4, in response to the process of FIG. 6 completing, a determination (400) is made as to whether a further event is detected. If so, the processes of FIG. 4 and FIG. 6 are repeated. For example, an event associated with temperature is detected and this may result in different actions being executed.

Alternatively, in order to determine whether the processes of FIG. 4 and FIG. 6 are to be repeated, a determination is made as to whether event values of determined events have changed. If so, the processes of FIG. 4 and FIG. 6 can be repeated. For example, the event value for the rain event may change due to the rain stopping and this may result in different actions being executed.

Alternatively, in order to determine whether the processes of FIG. 4 and FIG. 6 are to be repeated, a determination is made as to whether at least one of: a further event is detected; an event value of a determined event has changed; a configurable period of time has expired; etc.

Advantageously, detection and use of a plurality of events enables driving conditions to be indicated more accurately and appropriate actions to be executed.

It should be understood that the score logic described herein is exemplary. In another example, a score value can be associated with a combination of events. For example, a score value can be associated with a combination of a speed event and a rain event as shown below:

IF rain=≧6 AND speed=>60 THEN SCORE+=22.5

This allows for flexibility in that for example, a combination of a speed event and a rain event can be weighted differently from the individual events. Further, different combinations of types of events (e.g., a rain event and a speed event or a rain event and a temperature event) can be appropriately weighted.

In one example, the logic analyzer (305) uses weight logic (e.g., stored in the storage device (310)), to weight a combination of events and to determine a score value associated with the combination of events.

For example, the weight logic comprises a statement which when executed, weights a combination of the rain event and the speed event more highly than the individual events themselves. With reference to FIG. 5, a rain event with an event value of 12 has an associated score value of 8 and a speed event with an event value of 70 has an associated score value of 10.

In example weight logic, a statement defines a combination of the events as being weighted 25% higher than the individual events. This is because it may have been determined (e.g., using analysis of historical statistics) that the combination of events is more likely to require increased concentration from the user. Example weight logic is shown below:

IF rain=≧6 AND speed=>60 THEN WEIGHT+=25%

At 420, the logic analyzer (305) uses the score logic shown in FIG. 5 and the weight logic above to determine that the score value of the combination of events is (8+10)*25%=22.5.

Alternatively, a weighting is determined and incorporated into a score value (e.g., comprised in the score logic itself):

IF rain=≧6 AND speed=>60 THEN SCORE+=22.5

Advantageously, an appropriate action(s) can be executed to allow for a user to provide increased concentration for the combination of events. It should be understood that the appropriate action for the combination of events can be different from the action(s) associated with the individual events.

It should be understood that the apparatus of the present invention is operable to handle one or more hands-free devices, each of which support one or more mobile telephones. In the case wherein a plurality of hands-free devices and/or mobile telephones is required to be handled, each hands-free device and/or mobile telephone is pre-identified.

It should be understood that although in the description herein, the controller (225) communicates with a hands-free device, the controller can also communicate directly with a mobile telephone.

It should be understood that components such as the score logic, score values, actions, etc., are exemplary and that the components can be implemented in any number of ways.

It will be clear to one of ordinary skill in the art that all or part of the method of the embodiments of the present invention may suitably and usefully be embodied in a logic apparatus, or a plurality of logic apparatus, comprising logic elements arranged to perform the steps of the method and that such logic elements may comprise hardware components, firmware components, or a combination thereof.

It will be equally clear to one of skill in the art that all or part of a logic arrangement according to the embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave.

It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In another embodiment, the present invention may be realized in the form of computer implemented method of deploying a service comprising steps of deploying computer program code operable to, when deployed into a computer infrastructure and executed thereon, cause the computer system to perform all the steps of the described method.

It will be clear to one skilled in the art that many improvements and modifications can be made to the foregoing exemplary embodiment(s) without departing from the scope of the present invention.

What is claimed is:

1. An apparatus for processing event data for use with a communications system comprising a wireless device operable for use in a vehicle, the apparatus comprising:
   a receiver for receiving event data associated with the vehicle;
   a logic analyzer, responsive to receipt of the event data, for determining a score value associated with the event data; and
   a system, responsive to determining the score value, for identifying an action for execution.

2. The apparatus of claim 1, wherein the event data is associated with a plurality of events.

3. The apparatus of claim 1, wherein the receiver is operable to store the event data in a storage device.

4. The apparatus of claim 1, wherein the logic analyzer is operable to use the event data and score logic in order to determine the score value.

5. The apparatus of claim 4, wherein the logic analyzer is operable to use the event data to evaluate at least one statement associated with the score logic in order to determine the score value.

6. The apparatus of claim 1, further comprising:
   a system for generating the score value in accordance with statistical data associated with at least one of: a user of a vehicle and a vehicle.

7. The apparatus of claim 1, wherein the logic analyzer is operable to use the event data and weight logic in order to determine the score value.

8. The apparatus of claim 7, wherein the weight logic comprises a weight associated with a plurality of events.

9. The apparatus of claim 1, wherein the logic analyzer is operable to invoke an executor for executing the identified action.

10. The apparatus of claim 9, wherein the wireless device is a mobile telephone and the executor is operable to send a command to at least one of: the mobile telephone and a hands free device associated with the mobile telephone in order to execute the identified action.

11. The apparatus of claim 1, further comprising:
    a system for invoking the logic analyzer in response to at least one of: generation of further event data; and change associated with the event data and expiration of a time period.

12. A method for processing event data for use with a communications system comprising a wireless device operable for use in a vehicle, the method comprising:
    receiving event data associated with the vehicle;
    determining, in response to receipt of the event data, a score value associated with the event data; and
    identifying, in response to determining the score value, an action for execution.

13. The method of claim 12, wherein the event data is associated with a plurality of events.

14. The method of claim 12, wherein the receiving further stores the event data in a storage device.

15. The method of claim 12, wherein the determining uses the event data and score logic in order to determine the score value.

16. The method of claim 15, wherein the determining use the event data to evaluate at least one statement associated with the score logic in order to determine the score value.

17. The method of claim 12, further comprising:
    generating the score value in accordance with statistical data associated with at least one of: a user of a vehicle and a vehicle.

18. The method of claim 12, wherein the determining uses the event data and weight logic in order to determine the score value.

19. The method of claim 18, wherein the weight logic comprises a weight associated with a plurality of events.

20. The method of claim 12, wherein the determining invokes an executor for executing the identified action.

21. The method of claim 20, wherein the wireless device is a mobile telephone and the executor is operable to send a command to at least one of: the mobile telephone and a hands free device associated with the mobile telephone in order to execute the identified action.

22. The method of claim 12, further comprising:
    invoking the determining in response to at least one of: generation of further event data; and change associated with the event data and expiration of a time period.

23. A program product stored on a computer readable medium, which when executed, processes event data for use with a communications system comprising a wireless device operable for use in a vehicle, the computer readable medium comprising program code for:
    receiving event data associated with the vehicle;
    determining, in response to receipt of the event data, a score value associated with the event data; and
    identifying, in response to determining the score value, an action for execution.

* * * * *